April 10, 1934.  J. W. WYLAND  1,954,164
EGG SIZING MACHINE BY WEIGHT
Filed Feb. 19, 1930  4 Sheets-Sheet 1
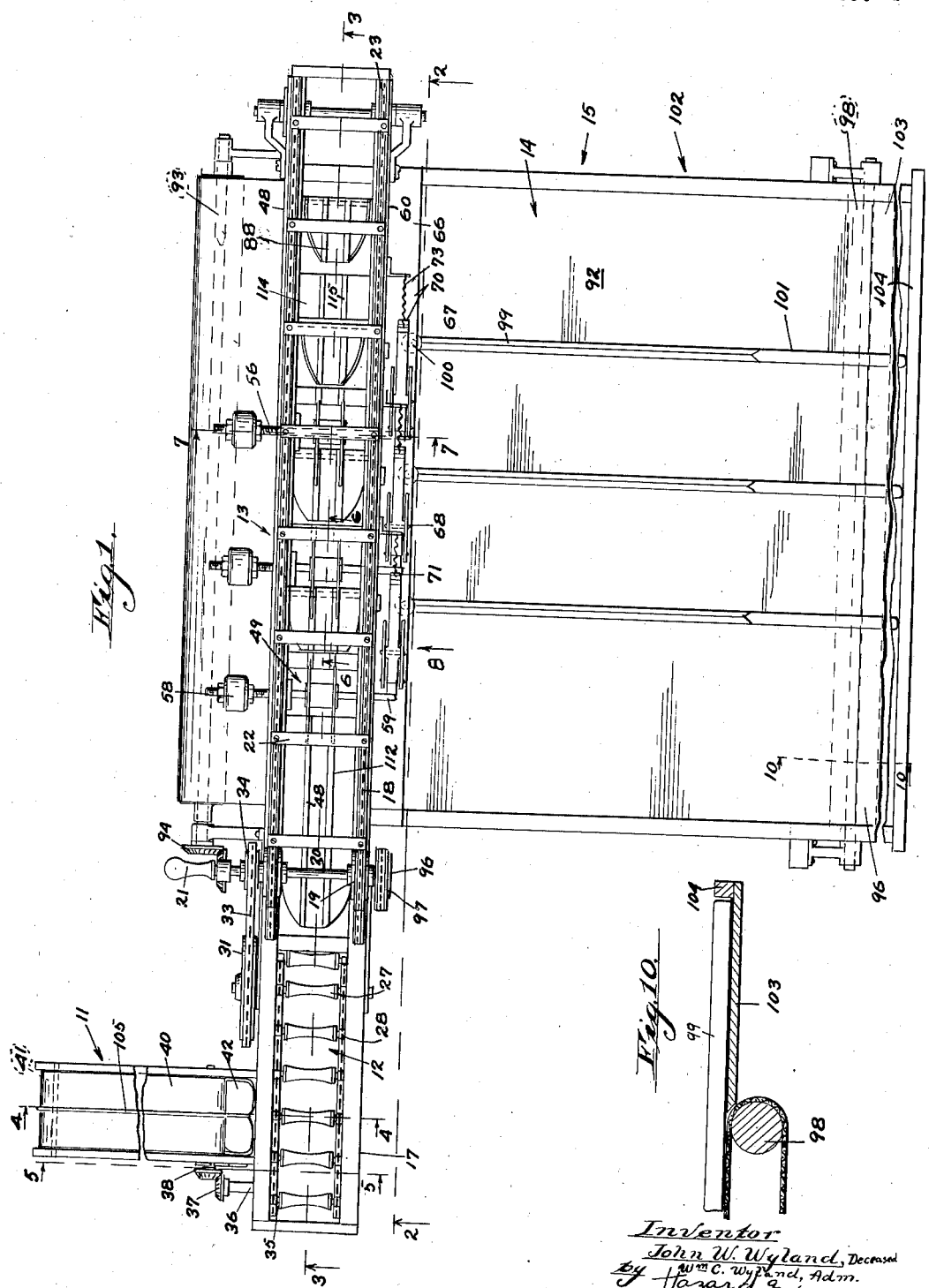

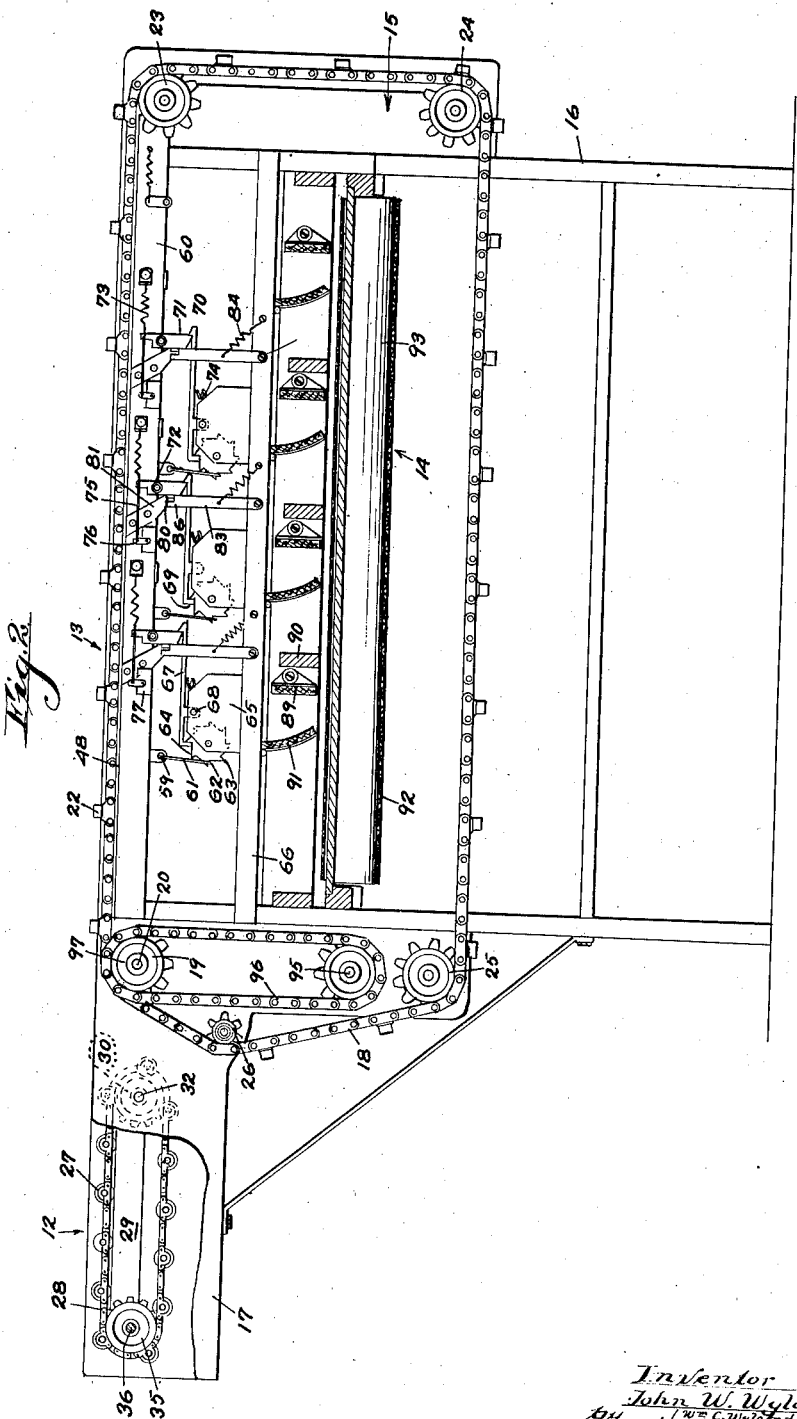

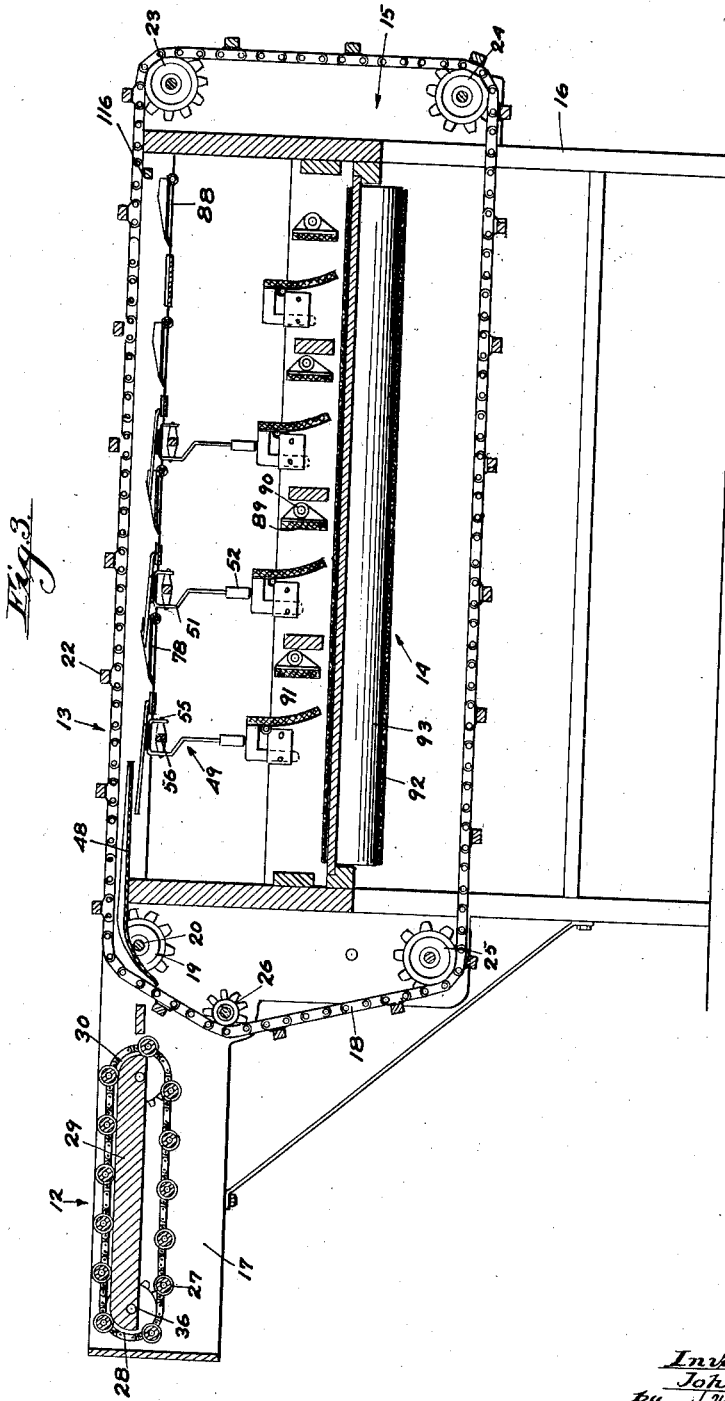

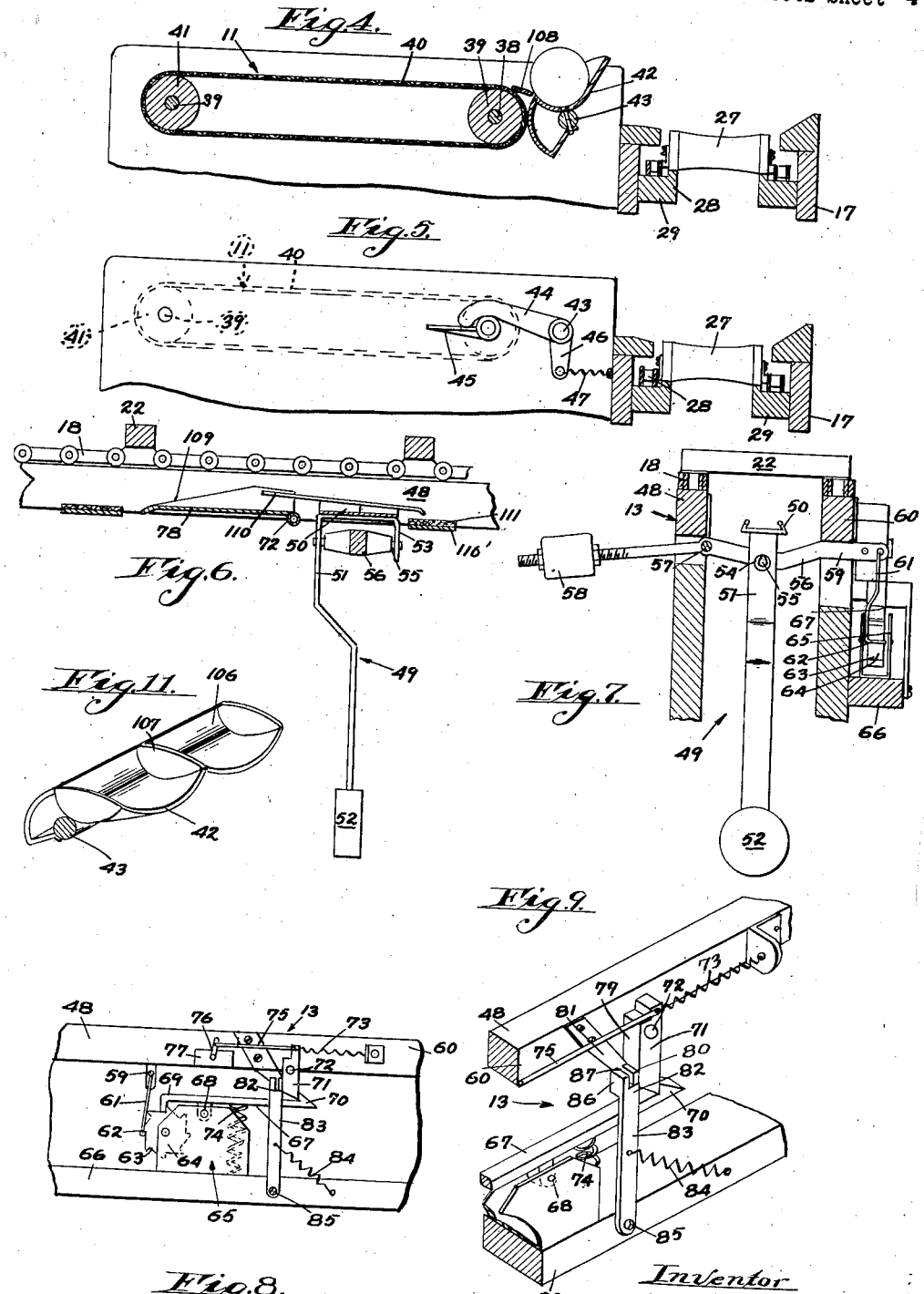

Patented Apr. 10, 1934

1,954,164

UNITED STATES PATENT OFFICE 1,954,164

EGG SIZING MACHINE BY WEIGHT

John W. Wyland, deceased, late of San Gabriel, Calif., by William Chester Wyland, administrator, San Gabriel, Calif.

Application February 19, 1930, Serial No. 429,724

20 Claims. (Cl. 209—121)

The invention pertains to an egg sizing machine by weight, in which the eggs traveling along a track cause the operation of sizing devices due to the weight of the egg and therefore the eggs are sorted into compartments in accordance with their different weights.

The present invention pertains somewhat to the type of machine set forth in U. S. patent for egg sizing machine by weight, 1,728,463 of September 17th, 1929, to John W. Wyland.

One of the features and object of the present invention is a mechanical construction of weighing the eggs and utilizing a mechanical arrangement for dumping or discharging the eggs in accordance with their size, in contradistinction to an electrically controlled arrangement as illustrated in the prior patent. In the present case the eggs in being moved over the track having a series of scales thereon, are adapted to operate or depress each scale as they pass thereover. When an egg is of sufficient weight to depress the scale sufficiently, it operates a releasing mechanism which causes the egg to drop when it moves on to a dropping platen.

Another feature and object of this invention is a construction by which the eggs are moved by a conveyor and at each weighing device the eggs advance ahead of the conveyor whereby an accurate weight may be obtained, the egg being entirely free of the conveyor and as the egg is weighed on a scale, it causes the depression of such scale and if such depression is sufficient, a ratchet type of device is operated, which after the egg passes off the weighing scale and on to the dropping platen, the dropping platen is released, the egg first passing on to a bridging piece before moving on to the dropping platen.

In this connection a detail feature of the invention is utilizing a ratchet wheel having a trigger operatively connected to the dropping platens, such platens being counter-weighted, whereby on depression of a weighing scale by an egg of sufficient weight, a ratchet wheel is operated on the release and return of the scale and this causes a release of the trigger, hence operating the dropping platen when the egg has advanced to such platen.

Another detailed object and feature of this invention is in actuating the counter for the different sizing and weighing devices, whereby by mechanical operation the number of eggs sorted is tallied by the counters.

Another detail feature of the invention is in a construction for transferring the eggs from an infeeding belt to a series of traveling rollers which convey the eggs to the sizing machine, there being a receiving and dumping device between the endless belt and the moving rollers to shift the eggs of the proper kind to be properly deposited on the conveyor having the rollers.

Another detailed object and feature of the invention is in the construction and mounting of padded receiving devices for the eggs which lessen the impact of the drop of the eggs from the dumping platens and deposit such eggs on a transversely moving belt and in cooperation with this belt there is employed division partitions which may be adjusted to decrease or enlarge the space into which the eggs are carried and from which they are loaded into position or the like, so that the size of the receiving compartments may be varied in accordance with the variation in sizes of the eggs passing through the machine.

The invention is illustrated in the accompanying drawings, in which,

Fig. 1 is a plan;

Fig. 2 is a vertical longitudinal section on the line 2—2 of Fig. 1 in the direction of the arrows, illustrating the weighing portion of the machine in elevation;

Fig. 3 is a longitudinal section on the line 3—3 of Fig. 1 in the direction of the arrows, this being principally through the weighing mechanism;

Fig. 4 is a transverse section on the line 4—4 of Fig. 1, through the infeeding belt and infeeding rollers;

Fig. 5 is a transverse section on the line 5—5 of Fig. 1 in the direction of the arrows, showing part of the infeeding mechanism in elevation;

Fig. 6 is a detail longitudinal section on the line 6—6 of Fig. 1 in the direction of the arrows, showing one of the weighing scales and dumping platform;

Fig. 7 is a transverse section on the line 7—7 in the direction of the arrows, showing part of the weighing scale and the mechanism actuated thereby;

Fig. 8 is a detail elevation taken in the direction of the arrow 8 of Fig. 1.

Fig. 9 is a detail perspective view of the detent and trigger release for the dumping panels;

Fig. 10 is a detail transverse section on the line 10—10 of Fig. 1 in the direction of the arrows.

Fig. 11 is a perspective view of the dumping plate for transferring the eggs from one conveyor to another.

In the accompanying drawings, there is illustrated an infeeding mechanism in the form of an endless belt, designated by the assembly 11. This feeds the eggs deposited thereon to a roller type of infeeding conveyor 12. The roller conveyor transfers the eggs to the machine for sizing by weight, having the weighing scales and designated generally by the assembly 13. After passing through the weighing machine the eggs are deposited on an outfeeding conveyor 14, this operating transversely to the weighing machine.

The machine is illustrated as being mounted on a frame designated generally by the numeral 15, this having legs 16 and a forward projection 17 carrying the infeeding conveyors 11 and 12. Two endless chains 18 are illustrated as passing over driving sprockets 19, these being mounted on the crank shaft 20 which may be driven by a hand crank 21 or other suitable driving mechanism. The chains are connected by slats 22 and pass over idler sprockets 23, 24, 25 and 26. These sprocket chains with the slats form the main conveying means for the eggs in the weighing machine. The roller conveyor 12 has a series of rollers 27, the opposite ends being journaled in a chain 28. The upper runs of these rollers pass over a board 29 and the chains are driven by sprocket wheels 30 driven from a gear wheel 31 on the sprocket shafts 32. This wheel has a belt or chain drive 33 from the sprocket wheel 34, actuated by the crank shaft.

A sprocket wheel 35 on the infeeding conveyor, has a shaft 36 which shaft has a bevel gear connection 37 to a shaft 38 carrying a drum 39 and over this drum there passes an endless belt 40, this belt passing over an idler drum 41, thus driving the cross feed conveyor belt. In order to deposit eggs on the rollers 27, the eggs are fed on the belt 40 and are carried to a tipping plate 42. This tipping plate is mounted on the rock shaft 43, which shaft has a lever 44 connected thereto at one end, which lever is adapted to engage with a rotatable arm 45 mounted on the shaft 38 and periodically actuate the lever to tilt the tipping plate 42 to thereby transfer the eggs on to the roller conveyor. A short lever 46 connected to the rock shaft 43, is actuated by a spring 47 attached to the framework of the machine to bring the tipping plate to its original position to receive the eggs from the belt.

The egg weighing machine itself has a leading trackway 48, this being formed of spaced rails, which is adapted to receive the eggs from the endless roller conveyor and by means of the slats 22 advance the eggs along the machine. Positioned transversely of the machine there are a series of weighing scales designated generally by the numeral 49. Each of these weighing scales has a platform 50 with tracks thereon (note particularly Fig. 6). The tracks are carried by a vertical bar 51 which has a weight 52 at the lower end. The bar has a downturned end 53 adjacent one end of the tracks on the platform and has openings 54 in the bar and the downturned end in which are mounted the fulcrum 55 of the scales. The fulcrum has a knife-like edge, thus forming an accurate pivoting movement. The fulcrum has a weighing lever or arm 56 connected thereto, this being pivoted at 57 as indicated to a frame of the machine and having an adjustable weight 58 thereon. This construction by having the rails and platform tiltable, equalizes or accommodates the unequal weight of the large and the small end of the egg, so that it is immaterial as to which end is on one side or the other of the machine, as the platform may tilt slightly on the fulcrum 55. This is somewhat in the same manner as in the prior patent above mentioned.

The free end 59 of the lever 56 extends beyond the side guide rails 60 of the machine and has a link 61 adjustably connected thereto. This link may be shifted to different positions of the lever and manifestly operates up and down as eggs are deposited on each weighing scale and pass off such scale. If an egg is of sufficient weight it lowers the hook 62 on the end of the link 61 so that it may catch underneath a tooth 63 of the ratch wheel 64 (note particularly Figs. 7 and 8). This ratchet wheel is mounted in a small frame 65 having side plates and such frame being carried by a bar 66 of the machine. Pivotally connected to this frame there is a detent lever 67 pivoted at 68 and having a dog 69 at one end positioned to engage the teeth of the ratchet wheel and to prevent their rotation. The other end has a hook 70 engaging a trigger 71 which is connected to the rock shaft 72. This trigger is under tension of the spring 73 to normally return the trigger to the hook 70 after release from the hook.

When the ratchet wheel 64 is rotated by the hook 62, on the end of the link engaging with one of the teeth and pulling this upwardly after an egg rolls off one of the weighing scales, the tooth acts as a cam on the dog end 69 of the lever 67, tilting this lever in such a manner that the hook end 70 is drawn downwardly. This action takes place against the resistance of the compression spring 74 which bears against the detent 67. This action releases the trigger 71 which has its upper end connected by a link 75 to a crank 76 operating a counter 77. The rock shaft 72 has the dumping or dropping panel 78 connected thereto so that as the weight of each egg in succession which has actuated a weighing scale and comes on such panel, may cause the tilting downwardly of such panel. The tilting of the panel is against the action of the spring 73.

When the detent lever 67 is in its normal latching position holding the trigger 71, this trigger has its back edge 79 bearing against the tip end side block 80 of an angular bracket 81 attached to one of the frame members of the machine (note particularly Fig. 9). At this time the lower back edge of the trigger thrusts against the upper portion 82 of the lever 83. This lever is under tension of a spring 84 tending to pivot this on the pivot pin 85. The lever 83 has a head block 86, which when the upper end 82 is pressed by the trigger 71 is slightly spaced as indicated at 87 from the tip end block 80 of the bracket 81. The end block 80 forms an abutment for the movement of the end 86, however, as soon as the trigger is released from the detent due to the weighing action of the egg on the weighing scale, the lever 83 can move forwardly sufficiently to start the tilting movement of the trigger, which tilting movement is completed by the egg rolling on the dumping platen and being discharged therethrough.

As the spring 84 pulls the lever 83 forwardly, this can move until the block 86 strikes the tip or abutment end block 80 of the bracket 81 and in so doing shifts the trigger 71 sufficiently so that should the detent 67 be thrust upwardly before the egg is dumped, that the hook 70 on the detent cannot engage the trigger until the dropping panel is tilted to its limit and fully discharge the egg. This construction prevents an egg which has been weighed and is of sufficient weight, to operate its adjacent scale from being passed on before the egg has a chance to be dumped.

The spring 84 is stronger than the tension spring 73, but on account of the momentum due to the return swing of the dumping platform, the spring 73 is aided in overcoming the tension of the spring 84, the lever 83 serving as a bumper.

Referring to Fig. 3, it will be seen that there are employed three weighing scales, each having its dumping platen controlled thereby and these will weigh eggs of different grades, the heaviest eggs being weighed and sorted first, the next lightest etc., and at the end of the machine there is a dumping platen 88 which may have a spring control similar to the three former platens, connected to a link such as 75, but this is intended for the smallest eggs which are not of sufficient size to be marketable in standard sizes and therefore these sizes of eggs are not accurately graded by weight.

The eggs after being dumped are received by a padded pivoted plate 89 (note Figs. 2 and 3). Such padded plate is pivoted as indicated at 90 to the frame of the machine and may be inclined at the proper angle to catch and break the fall of the eggs. The eggs are caught between this pivoted plate and fixed spring plates 91 which are also padded. This construction breaks the fall of the eggs so that they do not strike the outfeeding belt conveyor 14 with much force and hence the eggs are not broken in this operation. This outfeeding conveyor is an endless belt 92 which passes over a driven roller 93 which roller is driven by bevel gears 94 from the outfeed drive shaft 95 (note Fig. 2), which shaft is driven from a sprocket chain 96 operating from a sprocket wheel 97. This upper sprocket wheel 97 is driven by the crank 21. The outer end of the belt 92 is carried by a drum 98. The eggs are separated by pivotally mounted spacer partitions 99, these being mounted on pivots 100 secured to the frame of the machine. The outer ends are somewhat flattened as indicated at 101. By having the partitions pivoted, the operator whose duty it is to remove the graded eggs to different boxes or cases, may incline the partitions so as to accommodate a larger or smaller number of eggs of any one or more grades.

The frame 102 carrying the outfeeding endless belt conveyor extends beyond the outer drum 98 having the endless belt thereover as shown in Fig. 10 and beyond this belt there is a tray 103 with a ridge board 104 at the outer end. The eggs after being discharged from the endless belt, are deposited on the tray 103 and are then in a convenient position for the operator to load into cases.

While there are shown only three standard gradings or grading by weight, it is understood that a greater or a lessor number may be utilized if desired.

The infeeding conveyor 11 is provided with one or more partitions 105 dependent on its width, so that the eggs will be kept separate and be carried in separate paths by such belt conveyor. This partition extends sufficiently over the tipping plate so that the eggs are guided into the pockets 106 in such plate (note particularly Fig. 11). These pockets are formed by the concave curve considered in a longitudinal direction of the feed of the eggs and also the concave curve transversely of such feed, together with the partitions 107. As the eggs in the tipping plate are held stationary until the time for tipping and discharging, the eggs pressed thereagainst by the belt conveyor take a position with their long axis transverse to the belt. The eggs are carried from the belt to the tipping plate by the bridging plate 108.

The infeeding conveyor belt 40 is smooth-surfaced, and in operating the machine it is customary to load a relatively large number of eggs on this conveyor. When the eggs reach the tipping plate 42 and this is tilted upwardly in the position of Fig. 4, the movement of the eggs is blocked and the upper run of the conveyor slides underneath the eggs deposited on this infeeding conveyor belt. This, in effect, gives an automatic feed to the machine, for, as above mentioned, the infeeding belt may be of considerable length and loaded with a large number of eggs.

While the infeeding conveyor 11 is illustrated only of sufficient width to carry two rows of eggs abreast, I sometimes use a larger conveyor so that a considerable number of eggs may be fed abreast on the conveyor 11 to the roller conveyor 12. This roller conveyor shifts the position of the eggs so that their long axis is transverse to the weighing machine.

Another feature of the invention is in the feeding of the eggs along the sizing machine, in that at the approach to the scales there are a pair of upwardly inclined tracks 109 on each dumping panel, the eggs being shoved up these tracks by one of the slats attached to the endless chains and the eggs drop off the end of this track on to a resilient wire track 110 on the weighing scale. This resilient construction of the tracks on the weighing scale is sufficient to prevent the jar on the scales so that the scales are not affected by this drop of the egg. The tracks on the scales are downwardly inclined so that the eggs will roll ahead of the slats and thus obtain a true weight. The eggs passing off the weighing scales are carried over a bridging plate 110' which has tracks 111 preferably formed of felt, to the next dropping panel (note particularly Fig. 6). At the forward end of the machine where there is no dropping panel, the eggs are carried by a track 112.

In front of the last dumping panel 88 which is not operated by a weighing scale, the bridging plate 114 is wider than the other bridging plates and has a felt track 115. There is also a transverse bar 116 underneath the upper run of the chain carrying the slats, to positively stop the eggs on to the panel 88, to force this panel to dump. As this panel opens to the lightest weight eggs there is no danger of the bar 116 breaking any of the eggs.

It will be noted that an important feature of this invention in regard to the operation of the dumping panels by the weighing scales, is that the weight of the egg itself does not turn the ratchet which releases the detent of the trigger but there is the upward or return movement of the scale which has this effect. This upward or return movement is accomplished by the counter-weight on the scale. Therefore the eggs are quite free and clear of the platform of the scale before this upward movement takes place.

Various changes may be made in the principles of the invention without departing from the spirit thereof as set forth in the description, drawings and claims.

The spacer partitions 99 (illustrated in Fig. 1) which are pivoted at 100 have a frictional pivotal mounting so that the eggs when filling the space between any two partitions and between the ends of the frame carrying the outfeeding belt or the tray 103 press these partitions sideways and thus automatically increase and decrease the space occupied by the different sized eggs. Thus, if there is a much greater proportion of one weight or size of eggs than another, the portion of the tray occupied by the predominating eggs will have its partition thrust sideways by the pressure of the eggs themselves and thus the size of the space on the tray occupied by different grades or sizes of eggs is automatically changed.

What is claimed is:

1. In an egg sizing machine, a transverse infeeding conveyor having a driven endless belt, a tipping plate having means to temporarily hold eggs positioned adjacent one end of the belt, said plate being trough-shaped and having means to automatically periodically tip the plate to receive and discharge eggs, the said means being interconnected with the said belt, an endless chain roller conveyor in alignment with the sizing machine and positioned to receive eggs from the tipping plate, an interconnected drive between the belt and conveyor, a sizing machine by weight having a series of dropping panels, a transversely moving continuously outfeeding belt positioned below the dumping panels, and partitions pivotally connected to the sizing machine, adapted to separate the various grades of eggs, the said partitions being adjusted by the eggs pressing thereagainst.

2. In an egg sizing machine, a weighing scale having a dumping panel in alignment therewith, means to feed eggs in succession over the scale and the panel, a rotatable ratchet wheel, a hook connected to the scale to operate said ratchet when depressed by an egg of sufficient weight, a detent operatively connected to the ratchet and engaging the trigger restraining the panel, the detent being operated by the rotation of the ratchet and releasing the trigger whereby an egg may actuate the panel to a dumping position due to its weight thereon, and mechanical means to return the panel to its normal position and interengage the trigger and the detent.

3. In an egg sizing machine as claimed in claim 2, the trigger being adapted to engage a fixed abutment when interconnected with the said detent, a spring actuated movable device engaging the trigger to shift said trigger slightly when released from the said detent and thereby shift the trigger to prevent engagement of the trigger and the detent, said device being movable in the opposite direction after operation of the dumping panel, whereby the trigger and detent may interengage.

4. An egg feeding machine comprising in combination a movable endless chain having a series of slats to fit eggs, a plurality of weighing scales, each having a platform shiftable vertically due to the action of the eggs thereon, a pivotally mounted dumping panel adjacent each scale, a ratchet wheel, a hook operatively connected to each scale to rotate the wheel after the platform is depressed by an egg of sufficient weight, a pivotally mounted detent having one end engaging the ratchet wheel, a hook on the opposite end, the platen being mounted on a rock shaft with a trigger connected thereto, the trigger engaging the hook whereby on operation of the ratchet wheel by an egg of sufficient weight the detent is released from the trigger, an egg on the platen causing the pivoting downward thereof and dropping of the egg, a spring means to return the platen to its inoperative position for feeding eggs thereover, the said trigger and detent becoming latched on return of the platen.

5. An egg feeding machine as claimed in claim 4, a fixed abutment to limit the movement of the trigger, at a position engaging the hook, a pivotally mounted lever having a spring connected thereto, said lever bearing against the trigger and on release of the trigger from the detent shifting the trigger slightly to prevent interengagement of the trigger and the detent until after the panel connected with the said trigger has dumped, the movement of said lever being limited by the said abutment.

6. In an egg sizing machine having a dumping panel to dump eggs, a pivotally mounted plate and adjacent thereto a spring plate, the pivoted and the spring plate having padding thereon to engage a dropping egg and restrict the impact thereon.

7. In an egg sizing machine, a weighing scale having a platform depressible by an egg of sufficient weight, means to feed an egg on to said platform, means to return the platform to its original position after the passing of an egg thereover, a dumping panel positioned adjacent the discharge end of the scale, said panel being pivotally mounted to tilt by the weight of an egg, means to restrain the tilting of the panel, and an interconnecting means between the weighing scale and the panel to release the panel for dumping on the upward movement of the scale after an egg has passed off the said scale.

8. In an egg sizing machine having a weighing scale with a platform, means to feed eggs in succession on to the platform, the said paltform being depressible by an egg of sufficient weight, means to return the platform to its normal position after depression by an egg and the egg passing off the platform, a ratchet construction engaged by an interconnecting means between the platform and the ratchet on depression of the platform, the return of the platform to its normal position partly operating the ratchet, a pivoted dumping panel positioned to receive eggs from the platform and to dump by the weight of an egg, a restraining means between the ratchet and the panel to restrain the panel from dumping until released by the ratchet, whereby an egg operating the platform may be dumped by the next succeeding panel.

9. In an egg sizing machine, a weighing scale having a beam pivotally mounted transverse to the machine, a scale platform having a weight and pivotally mounted on the said beam, means to feed eggs in succession over the platform of the scale, the end of the lever having a hook connected thereto, a ratchet positioned to be engaged by the hook on depression of the scale and lever by an egg of sufficient weight, the lever having a counter-weight to return the platform to its normal position after passing of an egg thereover, a dumping panel, an interconnection from the ratchet to the dumping panel to dump an egg passing thereon if such egg is of sufficient weight to operate the scale.

10. In an egg sizing machine, tracks to support eggs, a feeding means for engaging the eggs forcing such eggs along the track, a weighing scale having a pivotally mounted lever with a platform thereon, the platform having a pivotal mounting on the lever with a depending weight, resilient tracks on the platform, said tracks being adapted to allow an egg to roll ahead of the feeding means, a hook connected to the end of the lever, a ratchet positioned to be engaged by the hook and to be shifted by the return movement of the platform, there being a counter-weight on the lever to return the platform to its normal position, a dumping panel, the feeding means carrying eggs over such panel, and an interconnection between the ratchet and the panel to dump eggs of sufficient weight to operate the said scale.

11. In an egg sizing machine, a transverse infeeding device having a movable endless belt with partitions extending longitudinally of the belt, a tipping plate having pockets therein to receive a plurality of eggs at a time off the belt, a roller conveyor operating at the end of the belt adjacent the tipping plate, and means to operate the tipping plate and the roller conveyor in synchronism to dump eggs from the plate between succeeding rollers on the roller conveyor.

12. In an egg sizing machine, the combination of an infeeding device having a movable endless belt with a partition longitudinally of such belt, a tipping plate having pockets to receive a plurality of eggs at the end of the said belt, an endless roller conveyor operating at the end of the belt and crosswise thereto adjacent the tipping plate, a sizing machine having a series of weighing scales and dumping panels in alignment with the roller conveyor and having an endless conveyor having a series of slats, means to interconnect the drive and to operate the tipping plate, the roller conveyor and the conveyor having the slats in synchronism, whereby the eggs may be dumped from the tipping plate on to the roller conveyor, each egg between two adjacent rollers and an egg being discharged from the roller conveyor is engaged by a slat on the sizing machine.

13. An egg sizing machine having a scale for weighing eggs, a diverting means, a supporting structure for the eggs between the scale and the diverting means, and a connection between the scale and the diverting means to release the diverting means on the return movement of the scale for diverting the eggs.

14. An egg sizing machine having a scale with a depressible platform to weigh eggs, a diverting means, a retension means for restraining the diverting means from operation, and means actuated by the upward movement of the platform after weighing an egg to release the restraining means to allow operation of the diverting means.

15. In an egg sizing machine, a scale having a depressible platform to weigh eggs, an egg diverting means, a supporting structure between the platform and the diverting means, a restraining device to restrain the diverting means from operation, and means operable on the return movement of the platform after being depressed in weighing an egg to release the restraining device and permit operation of the diverting means.

16. In an egg sizing machine, a tray having means to feed eggs thereto, said tray having opposite ends and with a plurality of pivotally mounted partitions extending at least partly across the tray between the ends, the said partitions being shiftable by the pressure of the eggs between any two partitions or between an end and a partition to enlarge or decrease the space between any two partitions or between a partition and an end of the tray in accordance with the eggs filling such spaces.

17. In an egg sizing machine, a scale having a depressible platform to weigh eggs, an egg diverting means operable by the weight of an egg thereon to divert the egg, a restraining device for the diverting means, and an interconnection between the platform and the restraining means to release the restraining means on the upward movement of the platform after an egg has been weighed on to the platform whereby on the egg engaging the diverting means the weight of the egg operates such means.

18. In an egg sizing machine, a weighing scale, an egg diverting means, a restraining means for the egg diverting means, a mechanical means operated by the scale after it has weighed an egg and returned to the normal position to release the restraining means, a mechanical means to initially partly move the diverting means, and means to return the diverting means to its original position after diverting an egg and to engage the restraining means.

19. In an egg sizing machine a transverse infeeding device having a smooth-surfaced movable endless belt, a tipping plate having a pocket therein to receive an egg at a time off of the belt, a roller conveyor operating at the end of the belt adjacent the tipping plate and in a direction at right angles to the belt, and means to operate the tipping plate and the roller conveyor in synchronism to dump an egg from the plate between succeeding rollers on the roller conveyor, said tilting plate when tilted upwardly forming a blocking means to prevent passage of eggs and to force the upper run of the endless belt to slide under eggs deposited thereon.

20. In an egg sizing machine, a transverse feeding device having a smooth-surfaced movable endless belt, a tipping plate having means to temporarily hold eggs deposited at the end of said belt, automatic means to actuate said plate to retain and to discharge eggs, a roller conveyor positioned longitudinally of the machine to receive eggs from the tipping plate, and an egg sizing machine in alignment with the roller conveyor, the tipping plate being operated by and in synchronism with the roller conveyor, and said tipping plate when tilted upwardly forming a blocking means to prevent passage of eggs and to force the upper run of the endless belt to slide under eggs deposited thereon.

WILLIAM CHESTER WYLAND,
*Administrator of the Estate of John W. Wyland, Deceased.*